United States Patent
Stoltenberg et al.

(10) Patent No.: US 9,505,192 B2
(45) Date of Patent: *Nov. 29, 2016

(54) NANOPOROUS MEMBRANES AND METHODS FOR MAKING THE SAME

(71) Applicant: LOCKHEED MARTIN CORPORATION, Bethesda, MD (US)

(72) Inventors: Randall M. Stoltenberg, Palo Alto, CA (US); Peter V. Bedworth, Los Gatos, CA (US); Scott E. Heise, Los Gatos, CA (US); Steven W. Sinton, Palo Alto, CA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 62 days.

This patent is subject to a terminal disclaimer.

(21) Appl. No.: 14/200,530

(22) Filed: Mar. 7, 2014

(65) Prior Publication Data

US 2014/0272286 A1 Sep. 18, 2014

Related U.S. Application Data

(60) Provisional application No. 61/779,098, filed on Mar. 13, 2013.

(51) Int. Cl.
*B32B 3/26* (2006.01)
*B29C 67/20* (2006.01)
(Continued)

(52) U.S. Cl.
CPC ............ *B32B 3/266* (2013.01); *B01D 67/006* (2013.01); *B01D 69/10* (2013.01); *B01D 69/122* (2013.01);
(Continued)

(58) Field of Classification Search
USPC ..................................... 216/56, 62
See application file for complete search history.

(56) References Cited

U.S. PATENT DOCUMENTS 7,960,708 B2 * 6/2011 Wolfe ............... B01D 67/0034
216/56
8,361,321 B2 1/2013 Stetson et al. ............ 210/652
(Continued)

FOREIGN PATENT DOCUMENTS

EP 0 364 628 A1 4/1990 ............ B01D 61/00
WO WO 2007/140252 A1 12/2007 ............ B01D 71/00
(Continued)

OTHER PUBLICATIONS

AMI Applied Membranes Inc., Filmtec Nanofiltration Membrane Elements, appliedmembranes.com/nanofiltration_elements.htm, accessed Apr. 28, 2015.
(Continued)

*Primary Examiner* — Shamim Ahmed
(74) *Attorney, Agent, or Firm* — Foley & Lardner LLP

(57) ABSTRACT

A method for making a nanoporous membrane is disclosed. The method provides a composite film comprising an atomically thin material layer and a polymer layer, and then bombarding the composite film with energetic particles to form a plurality of pores through at least the atomically thin material layer. The nanoporous membrane also has a atomically thin material layer with a plurality of apertures therethrough and a polymer film layer adjacent one side of the graphene layer. The polymer film layer has a plurality of enlarged pores therethrough, which are aligned with the plurality of apertures. All of the enlarged pores may be concentrically aligned with all the apertures. In one embodiment the atomically thin material layer is graphene.

13 Claims, 2 Drawing Sheets

(51) Int. Cl.
  *B44C 1/22* (2006.01)
  *B32B 9/00* (2006.01)
  *B01D 67/00* (2006.01)
  *B01D 69/10* (2006.01)
  *B01D 69/12* (2006.01)
  *B01D 71/02* (2006.01)

(52) U.S. Cl.
  CPC ............ *B01D 71/021* (2013.01); *B29C 67/20* (2013.01); *B32B 9/00* (2013.01); *B01D 2323/34* (2013.01); *B01D 2325/028* (2013.01); *Y10T 428/24322* (2015.01)

(56) References Cited

U.S. PATENT DOCUMENTS

| | | | |
|---|---|---|---|
| 8,617,411 B2* | 12/2013 | Singh .................. | H01L 21/3065 216/62 |
| 9,028,663 B2 | 5/2015 | Stetson, Jr. et al. | |
| 9,067,811 B1 | 6/2015 | Bennett et al. | |
| 9,095,823 B2 | 8/2015 | Fleming | |
| 2003/0159985 A1* | 8/2003 | Siwy ...................... | B01D 69/02 210/500.39 |
| 2007/0032054 A1 | 2/2007 | Ramaswamy et al. | |
| 2009/0117335 A1* | 5/2009 | Iyoda .................. | H01L 21/0337 428/159 |
| 2010/0327847 A1 | 12/2010 | Leiber et al. ................. | 324/71.1 |
| 2011/0120970 A1* | 5/2011 | Joo ......................... | C03C 17/32 216/24 |
| 2011/0139707 A1 | 6/2011 | Siwy et al. .............. | 210/500.21 |
| 2012/0048804 A1 | 3/2012 | Stetson et al. ................ | 210/653 |
| 2012/0255899 A1 | 10/2012 | Choi et al. ..................... | 210/489 |
| 2012/0267337 A1 | 10/2012 | Striemer et al. | |
| 2013/0015136 A1 | 1/2013 | Bennett | |
| 2013/0105417 A1 | 5/2013 | Stetson et al. | |
| 2013/0240355 A1 | 9/2013 | Ho et al. | |
| 2013/0248367 A1 | 9/2013 | Stetson et al. | |
| 2013/0249147 A1 | 9/2013 | Bedworth | |
| 2013/0256210 A1 | 10/2013 | Fleming | |
| 2013/0256211 A1 | 10/2013 | Fleming | |
| 2013/0270188 A1* | 10/2013 | Karnik ................. | B01D 53/228 210/650 |
| 2013/0277305 A1 | 10/2013 | Stetson et al. | |
| 2014/0261999 A1 | 9/2014 | Stetson et al. | |
| 2014/0263035 A1 | 9/2014 | Stoltenberg et al. | |
| 2014/0263178 A1 | 9/2014 | Sinton et al. | |
| 2014/0377738 A1 | 12/2014 | Bachmann et al. | |
| 2015/0075667 A1 | 3/2015 | McHugh et al. | |
| 2015/0217219 A1 | 8/2015 | Sinsabaugh et al. | |
| 2015/0218210 A1 | 8/2015 | Stetson et al. | |
| 2015/0221474 A1 | 8/2015 | Bedworth et al. | |
| 2015/0247178 A1 | 9/2015 | Mountcastle et al. | |
| 2015/0258254 A1 | 9/2015 | Simon et al. | |
| 2015/0258498 A1 | 9/2015 | Simon et al. | |
| 2015/0258502 A1 | 9/2015 | Turowski et al. | |
| 2015/0258503 A1 | 9/2015 | Sinton et al. | |
| 2015/0258525 A1 | 9/2015 | Westman et al. | |
| 2015/0268150 A1 | 9/2015 | Newkirk et al. | |
| 2015/0321147 A1 | 11/2015 | Fleming et al. | |
| 2015/0336202 A1 | 11/2015 | Bedworth et al. | |
| 2016/0009049 A1 | 1/2016 | Stoltenberg et al. | |
| 2016/0058932 A1 | 3/2016 | Stetson et al. | |
| 2016/0067390 A1 | 3/2016 | Simon et al. | |
| 2016/0074815 A1 | 3/2016 | Sinton et al. | |

FOREIGN PATENT DOCUMENTS

| | | | | |
|---|---|---|---|---|
| WO | WO 2011/094204 A2 | 8/2011 | ............. | C01B 31/02 |
| WO | WO 2013/138698 A1 | 9/2013 | ................ | C02F 1/44 |

OTHER PUBLICATIONS

Wadvalla (2012), "Boosting agriculture through seawater," Nature Middle East, doi:10.1038/nmiddleeast.2012.92 <<natureasia.com/en/nmiddleeast/article/10.1038/nmiddleeast.2012.92?WT.mc_id=FBK_NatureMEast>> Accessed Jul. 30, 2015.

Clochard, "Track-etched polymer membranes," Ecole Polytechnique, lsi.polytechnique.fr/home/research/physics-and-chemistry-of-nano-objects/track-etched-polymer-membranes-97035.kjsp Accessed Jul. 30, 2015.

Wikipedia, "Ion track" en.wikipedia.org/wiki/Ion_track Accessed Jul. 30, 2015.

O'Hern et al. (2012), "Selective Molecular Transport through Intrinsic Defects in a Single Layer of CVD Graphene" ACS Nano, 2012, 6 (11), pp. 10130-10138.

Zan et al. (2012), "Graphene Reknits Its Holes", Nano Lett., 2012, 12 (8), pp. 3936-3940.

International Search Report mailed Jun. 5, 2014 in corresponding application No. PCT/US2014/021677.

Written Opinion mailed Jun. 5, 2014 in corresponding application No. PCT/US2014/021677.

International Search Report mailed Jun. 19, 2013 in corresponding application No. PCT/US2013/030344.

Written Opinion mailed Jun. 19, 2013 in corresponding application No. PCT/US2013/030344.

Baker; *Membrane Technology and Applications*; Membrane Technology and Applications; Apr. 14, 2004; pp. 92-94.

Apel; *Track etching technique in membrane technology*; Radiation Measurements, Elsevier, Amsterdam, vol. 34, No. 1-6; Jun. 1, 2001; pp. 559-566.

Fischbein et al; *Electron beam nanosculpting of suspended graphene sheets*; Applied Physics Letters; American Institute of Physics; vol. 93, No. 11; Sep. 16, 2008.

Kim et al.; *Fabrication and Characterisation of Large Area, Semiconducting Nanoperforated Graphene Materials*; Nano Letters; American Chemical Society; vol. 10, No. 4; Apr 14, 2010; p. 1125, col. 2, line 25 - p. 1126, col. 1, line 11.

Vlassiouk et al.; *Versatile ultrathin nanoporous silicon nitride membranes*; Proceedings of the National Academy of Sciences; National Academy of Sciences; vol. 106, No. 50; Dec. 15, 2009; pp. 21039-21044.

O'Hern et al.; *Selective Ionic Transport through Tunable Subnanometer Pores in Single-Layer Graphene Membranes*; Nano Letters; vol. 14, No. 3; Mar. 12, 2014; pp. 1234-1241.

Liu et al.; *Atomically Thin Molybdenum Disulfide Nanopores with High Sensitivity for DNA Translocation*; ACS Nano; vol. 8, No. 3; Mar. 25, 2014; pp. 2504-2511.

Childres et al.; *Effect of oxygen plasma etching on graphene studied using Raman spectroscopy and electronic transport measurements*; New Journal of Physics; Feb. 2011, vol. 13.

Kim et al.; *The structural and electrical evolution of graphene by oxygen plasma-induced disorder*; Nanotechnology IOP Publishing Ltd, UK; vol. 20, No. 37; Sep. 16, 2009.

Zhang et al.; *Method for anisotropic etching of graphite or graphene*; Institute of Physics, Chinese Academy of Sciences; Peop. Rep. China; Mar. 30, 2011.

Bai (Jingwei) et al.; *Graphene nanomesh*; Nature Nanotechnology; Feb. 14, 2010; whole document.

Jiang et al.; *Porous graphene as the ultimate membrane for gas separation*; Nano Letters; Americal Chemical Society, USA; Dec. 9, 2009; vol. 9, No. 12; pp. 4019-4024.

Karan et al.; *Ultrafast Viscous Permeation of Organic Solvents Through Diamond-Like Carbon Nanosheets*; Science Magazine; vol. 335; Jan. 27, 2012.

Morse; *Scalable Synthesis of Semiconducting Nanopatierned Graphene Materials*; InterNano Resources for Nanomanufacturing; Apr. 30, 2010.

International Preliminary Report on Patentability dated Sep. 15, 2015, corresponding to International Application No. PCT/US2014/021677.

Allen et al. (Oct. 2002), "Craters on silicon surfaces created by gas cluster ion impacts," Journal of Applied Physics, vol. 92, No. 7, pp. 3671-3678.

(56) References Cited

OTHER PUBLICATIONS

Cohen-Tanugi et al. (Jun. 2012), "Water Desalination across Nanoporous Graphene", ACS Publications; MIT; 2012 dx.doi.org/10.1021/nl3012853 Nano Lett. 2012, 12(7), pp. 3602-3608.

Inui et al. (Dec. 2009), "Molecular dynamics simulations of nanopore processing in a graphene sheet by using gas cluster ion beam," Appl Phys A (2010) 98: 787-794.

Lehtinen et al. (Feb. 2011), "Cutting and controlled modification of graphene with ion beams," Nanotechnology 22 175306.

Liu et al. (Jun. 2008), "Graphene Oxidation: Thickness-Dependent Etching and Strong Chemical Doping," Nano Lett. 2008, vol. 8, No. 7, p. 1965-1970.

O'Hern et al. (Sep. 2011), "Development of process to transfer large areas of LPCVD graphene from copper foil to a porous support substrate," Massachusetts Institute of Technology, Thesis, pp. 1-62.

Plant et al. (Oct. 2013), "Size-dependent propagation of Au nanoclusters through few-layer graphene," Nanoscale, DOI: 10.1039/c3nr04770a.

Russo et al. (Apr. 2012), "Atom-by-atom nucleation and growth of graphene nanopores," PNAS, vol. 109, No. 16, pp. 5953-5957.

Zhao et al. (May 2012), "Drilling Nanopores in Graphene with Clusters: A Molecular Dynamics Study," J. Phys. Chem. C 2012, 116, 11776-11782.

\* cited by examiner

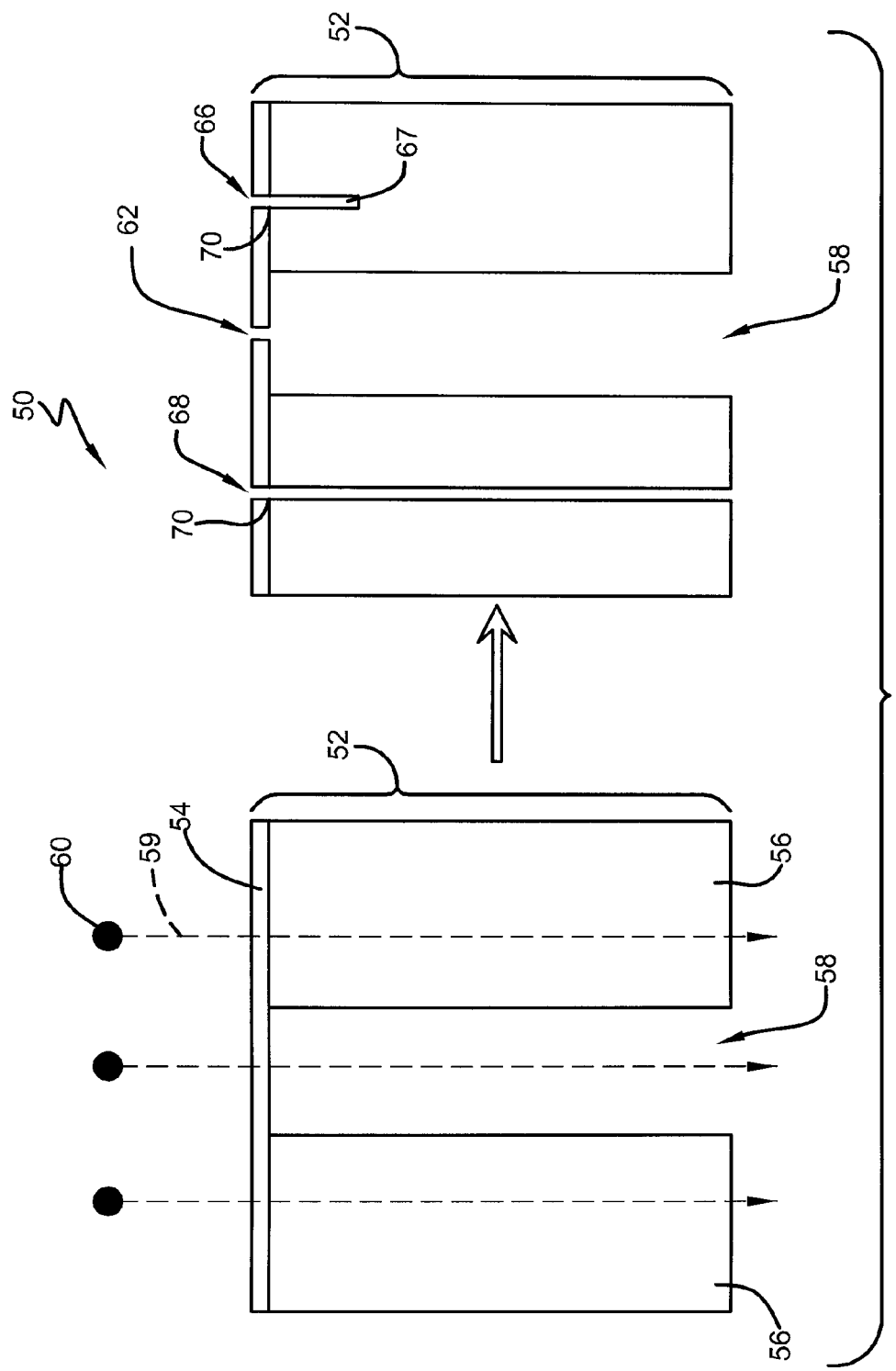

NANOPOROUS MEMBRANES AND METHODS FOR MAKING THE SAME

CROSS REFERENCE TO RELATED APPLICATION

This application claims priority of Provisional application Ser. No. 61/779,098 filed Mar. 13, 2013 and which is incorporated herein by reference.

TECHNICAL FIELD

Generally, the present invention is directed toward a nanoporous membrane and methods for making the membrane. More particularly, the present invention is directed to a nanoporous membrane made up of an atomically thin layer of material and a polymer film wherein nanosize holes are provided in the atomically thin layer and concentric nanosize or microsize holes are provided in the polymer film.

BACKGROUND ART

The ability to manipulate individual atoms for use in nanotechnology components continues to develop. Some of these developments are in the field of materials and specifically atomically thin materials which may use a single molecular component or selected combinations of molecular components. One example of such a material is graphene which is a two-dimensional aromatic carbon polymer that has a multitude of applications ranging from electronic memory, electrical storage, composite enhancement, membranes and the like. Other atomically thin materials are believed to have their own beneficial properties.

One non-limiting example of an atomically thin material is graphene. A graphene membrane is a single-atomic-layer-thick layer of carbon atoms, bound together to define a sheet. The thickness of a single graphene membrane, which may be referred to as a layer or a sheet, is approximately 0.2 to 0.3 nanometers (nm) thick, or as sometimes referred to herein "thin." The carbon atoms of the graphene layer define a repeating pattern of hexagonal ring structures (benzene rings) constructed of six carbon atoms, which form a honeycomb lattice of carbon atoms. An interstitial aperture is formed by each six carbon atom ring structure in the sheet and this interstitial aperture is less than one nanometer across. Indeed, skilled artisans will appreciate that the interstitial aperture is believed to be about 0.23 nanometers across at its longest dimension. Accordingly, the dimension and configuration of the interstitial aperture and the electron nature of the graphene precludes transport of any molecule across the graphene's thickness unless there are perforations.

Recent developments have focused upon graphene membranes for use as filtration membranes in applications such as salt water desalination. One example of such an application is disclosed in U.S. Pat. No. 8,361,321 which is incorporated herein by reference. As these various uses of graphene and other atomically thin materials develop, there is a need to manufacture materials and supporting substrates which have nano or micro size apertures or holes.

Nanoporous membranes which have a pore size of 0.1-10 nm are difficult to manufacture because the membrane must typically be extremely thin to allow such a small pore size to persist throughout the membranes' thickness. Accordingly, the membrane bearing the pore must be supported on a thicker porous substrate to embue the final composite membrane with sufficient mechanical strength.

A current method of making such a composite membrane uses perforated graphene (thickness about 1 nm) as an active membrane material and a porous polycarbonate film (thickness about 5-10 μm) as the supporting substrate. These two layers are mated to on another after the holes in each are already made. The holes in both substrates are not registered or aligned with one another, hence flow through the composite membrane is limited by the statistics of overlapping holes. In other words, flow through the composite membrane is limited based on the random alignment of the holes in the graphene membrane material coincidentally aligning with the holes of the porous polycarbonate film The mating of perforated atomically thin materials, such as graphene, and porous polycarbonate films to create composite membranes for nanofiltration are believed to provide an improvement over other filtration type membranes. Other nanoporous membranes are made of thicker polymer films with tortuous paths that demonstrate nanoscale exclusion, but they typically have extremely low permeability as a result of their thickness. Therefore, there is a need in the art to provide a nanoporous membrane with an atomically thin material layer and a polymer layer that have aligned concentric holes. Moreover, this is a need in the art for a nanoporous membrane which provides for concentric holes through the atomically thin material layer and the polymer film layer wherein the holes through the polymer film layer are substantially larger in diameter than the diameter of holes through the atomically thin material layer.

SUMMARY OF THE INVENTION

In light of the foregoing, it is a first aspect of the present invention to provide nanoporous membranes and methods for making the same.

It is another aspect of the present invention to provide a method for making a nanoporous membrane, comprising providing a composite film comprising an atomically thin material layer and a polymer film, and bombarding the composite film with energetic particles to form a plurality of pores through at least the atomically thin material layer.

It is another aspect of the above embodiment to provide for selecting energetic particles so as to form the plurality of holes through the atomically thin material layer and the polymer film so that the polymer film is chemically functionalized.

It is yet another aspect of the above embodiment to provide for etching the polymer film to form a plurality of enlarged pores in the polymer film.

It is still another aspect of the above embodiment to provide for each of the plurality of enlarged pores so that they are substantially aligned with one of the plurality of pores through the atomically thin material layer.

It is a further another aspect of the above embodiment to provide for the plurality of pores through the atomically thin material layer range in size from 0.5 nm to about 10 nm, wherein the plurality of enlarged pores from 10 nm to 1000 nm, and wherein the plurality of enlarged pores so that they have a diameter larger than the plurality of pores. The method may also include controlling the bombarding and etching so that the plurality of enlarged pores have a diameter larger than the plurality of pores.

It is yet another aspect of the above embodiment to provide for providing the atomically thin material layer as a single atomic layer of carbon material, or to provide the atomically thin material layer as multiple atomic layers of carbon material. The method may also include selecting the atomically thin material from the group consisting of graphene, few layer graphene, molybdenum disulfide, boron nitride, hexagonal boron nitride, niobium diselenide, silicene, and germanene.

Still a further aspect of the method is to utilize polycarbonate as the polymeric film.

Another aspect of the method is to provide a porous polymer film as part of the composite film.

In another mode of this method, the energetic particles may be selected so as to leave the polymer film chemically inert toward pore enlargement. And the method may include chemically bonding the atomically thin material layer to the polymer film during bombarding. Or the method may bombard the atomically thin material layer to form the plurality of pores only through the atomically thin material layer.

And the method may provide that the plurality of pores through the atomically thin material layer range in size from about 0.5 nm to about 10 nm.

Still another aspect of the present invention is to provide a nanoporous membrane comprising an atomically thin material layer having a plurality of apertures therethrough, and a polymer film layer adjacent one side of the atomically thin material layer, the polymer film layer having a plurality of enlarged pores therethrough, wherein the plurality of enlarged pores are aligned with the plurality of apertures.

In one variation of the above aspect, the membrane may be constructed so that the plurality of apertures can range in diameter from 0.5 nm to 10 nm, and wherein the plurality of enlarged pores range in diameter from 10 nm to 1000 nm.

And the plurality of enlarged pores may have a diameter larger than the plurality of apertures.

In another variation of the above aspect, the membrane may be constructed so that the pluralities of enlarged pores have a diameter larger than the plurality of apertures.

In still another variation of the above aspect, the membrane may be constructed so that the atomically thin material layer is chemically bonded to the polymer film, at an edge of the plurality of apertures.

And yet another variation of the above aspect is that the membrane may be constructed so that substantially all of the pluralities of enlarged pores are concentrically aligned with the plurality of apertures.

A further variation of the above aspect it that the atomically thin material layer may be selected from the group consisting of graphene, few layer graphene, molybdenum disulfide, boron nitride, hexagonal boron nitride, niobium diselenide, silicene, and germanene.

BRIEF DESCRIPTION OF THE DRAWINGS

These and other features and advantages of the present invention will become better understood with regard to the following description, appended claims, and accompanying drawings. The figures may or may not be drawn to scale and proportions of certain parts may be exaggerated for convenience of illustration.

FIG. 2 is a schematic diagram of a process according to the concepts of the present invention for making a nanoporous membrane with an initially porous polymer film.

BEST MODE FOR CARRYING OUT THE INVENTION

Figure 1:
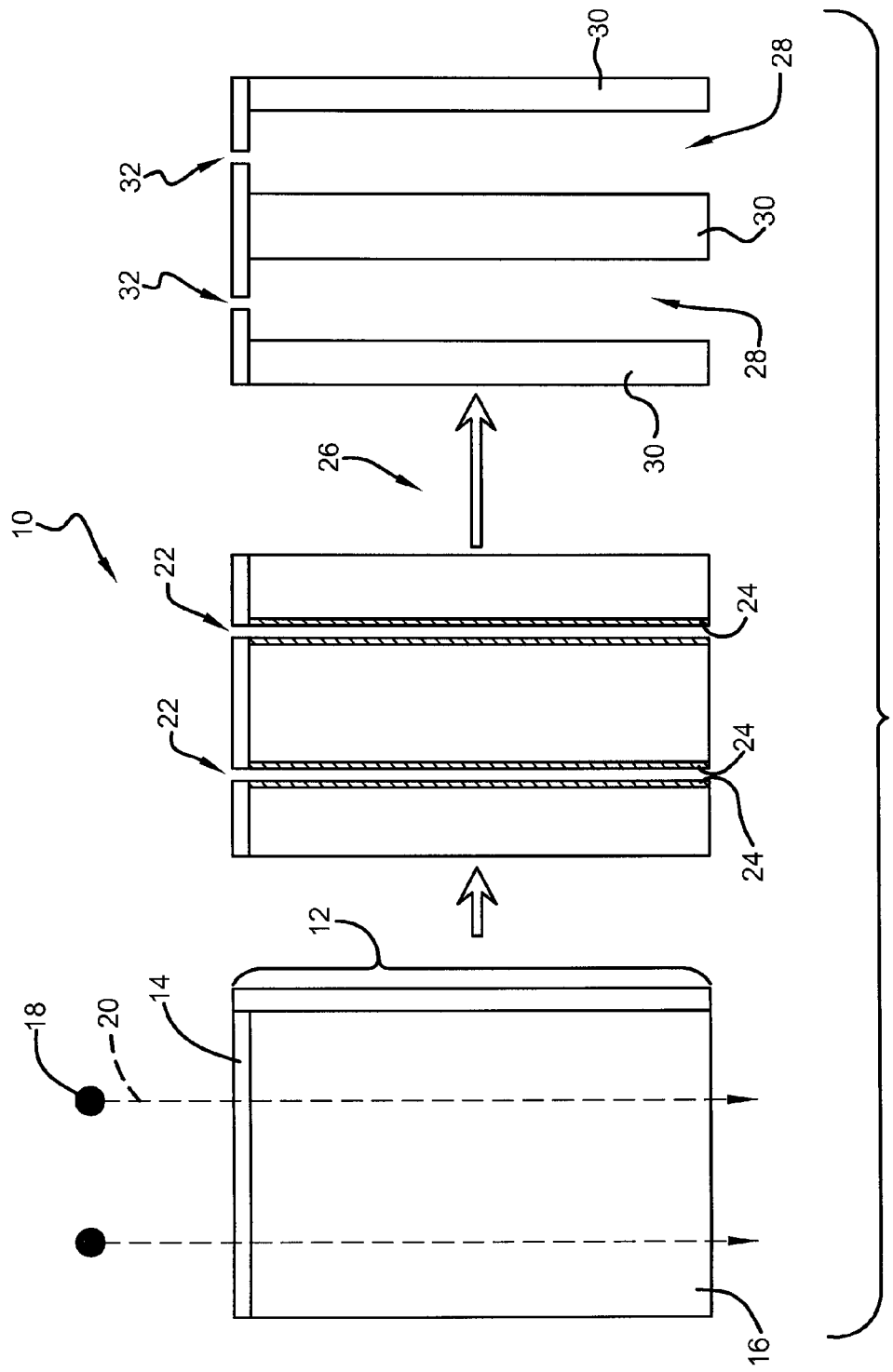
FIG. 1 is a schematic diagram of a process according to the concepts of the present invention for making a nanoporous membrane with an initially non-porous polymer film.

Referring now to FIG. 1, it can be seen that a method of forming a nanoporous membrane is designated generally by the numeral 10. Initially, a composite film 12 is provided wherein the film 12 includes an atomically thin material in the form of a layer 14 laminated to a non-porous polymer film 16. The composite film 12 may be provided by laminating the atomically thin material layer 14 to the polymer film 16 in a hot press manufacturing operation wherein the film 12 and layer 14 are brought together and raised to a sufficient temperature so as to at least provide a minimal interconnection force between the film 12 and the layer 14. Other methods could be employed to form the composite film 12. In the embodiment presented below, the atomically thin material is graphene. Other atomically thin materials that could by used for the layer 14 include, but are not limited to, few layer graphene, molybdenum disulfide, boron nitride, hexagonal boron nitride, niobium diselenide, silicene, and germanene.

In one embodiment, and as discussed above, the graphene layer is a single-atomic-layer-thick layer of carbon atoms, bound together to define a sheet. The thickness of a single graphene layer, which may be referred to as a membrane or a sheet, is approximately 0.2 to 0.3 nanometers (nm). In some embodiments, multiple graphene layers can be formed, having greater thickness and correspondingly greater strength. Multiple graphene sheets can be provided in multiple layers as the membrane is grown or formed. Or multiple graphene sheets can be achieved by layering or positioning one graphene layer on top of another. For all the embodiments disclosed herein, a single layer of graphene or multiple graphene layers, sometimes referred to as few layer graphene, may be used. Testing reveals that multiple layers of graphene maintain their integrity and function as a result of self-adhesion. This improves the strength of the membrane and in some cases flow performance. Once perforated, in methods to be discussed, the graphene layer provides high-flux throughput material that significantly improves filtration properties, as opposed to polyimide or other polymeric material filtration materials. In most embodiments, the graphene membrane is 0.5 to 2 nanometers thick. But thicknesses up to 10 nanometers or more can be employed. In any event, the dimension and configuration of the interstitial aperture and the electron nature of the graphene precludes transport of any molecule across the graphene's thickness unless there are perforations. The interstitial aperture dimension is much too small to allow the passage of either water or ions.

The non-porous polymer film 16 in most embodiments is a polycarbonate film having a thickness ranging anywhere from ten microns to thousands of microns thick. In most embodiments, the thickness of the polymer film 16 will range from twenty-five microns to two hundred and fifty microns. Other materials such as polyester, polyimide, polypropylene, polyvinylidene fluoride, or poly methyl methacrylate or the like may be used for the film.

The next step in the method 10 is to generate energetic particles 18. The particles may be in the form of electrons, ions, neutrons, ion clusters and the like that are sufficiently energetic to traverse the polymer composite film, typically >1 MeV/micron thickness with fluences between $10^6$ ions/$cm^2$ and $10^{13}$ ions/$cm^2$ that are directed toward the composite film 12 in a bombardment operation designated generally by the numeral 20. In one embodiment, the energetic particles are directed toward the layer 14 which may be graphene or other atomically thin material as indicated above. However, in other embodiments it is believed that the energetic particles 18 could be directed by bombardment toward the polymer film 16 side of the composite film 12. Skilled artisans will appreciate that the term bombardment may also be referred to as irradiating. In any event, the particles 18 pass through the film leaving a "track" of chemical functionality on the subnanometer to nanometer scale of the polymer film material. Indeed, the bombardment of the energetic particles 18 form a track pore 22 through the film 12. The track pores 22 are of a uniform size and can range anywhere from 0.5 nm in diameter to 10 nm in diameter. The diameter size of the pore is determined by the bombardment step 20 and the selection of the particular type of energetic particles 18. Skilled artisans will appreciate that various factors can be used in the selection of the energetic particles and the bombardment step so as to directly affect the diameter size. These factors include but are not limited to residence time that the energetic particles are bombarded against the composite film, the types of particles or materials selected for the energetic particles, and other factors such as particle flux. As noted, the energetic particles 18 selected for use in the bombardment step form a chemical functionalization 24 along the entire surface of the track pores 22 in the polymer film 16. Skilled artisans will appreciate that the chemical functionalization 24 of the pores 22 alters the chemical nature of the polymer film material. The portion of the pore extending through the layer 14 may be functionalized by the irradiation, but the functionality will be inert to the further chemical process to be described.

Upon completion of the bombarding step 20, the composite film 12 undergoes an etching process 26. In this process 26 the entire film 12 is immersed in an appropriate fluid or gas. In the case of polycarbonate, sodium hydroxide solution is used for a predetermined period of time. Depending upon the polymer used for the polymer film 16, other types of etching fluid or gas may be used. The fluid or gas in the etching process attacks the chemical functionalization 24 of the polymer material in the pores 22 so as to effectively remove the chemical functionalization area and widen or increase the diameter of the track pores 22 to form enlarged pores 28 through the polymer film 16. Skilled artisans will appreciate that the etching step does not alter in any significant way the pore 22 associated with or extending through the layer 14.

In one embodiment, it will be noted by skilled artisans that any imperfections in the graphene film or layer 14 can be mitigated by adding additional layers of graphene. As such, the probability of overlapping imperfections in the graphene layer is lowered significantly with each additional layer. Due to their atomic-scale thickness, added graphene layers should not alter the penetration of the energetic particles 18 through the composite film 12. In any event, the plurality of enlarged pores 28 is provided in the polymer film layer 16. Depending upon the amount of chemical functionalization of 24 and the parameters of the etching process 26, the size and diameter of the pores can be controlled.

In the present embodiment the diameter of the pores 28 may range from 10 nm to 1000 nm and are of a consistently uniform size as determined by those parameters. As a result of the etching process a residual polymer structure 30 is provided for supporting the adjacent side of the layer 14. The end result of the etching process provides for, in the present embodiment, a layer 14 which has a plurality of graphene apertures or pores 32 which may have a diameter of 0.5 to 10 nm in diameter. Moreover, the graphene apertures 32 are concentrically aligned with the enlarged pores 28. As a result, the composite film 12 is provided with concentrically aligned graphene pores and polymer film pores in a maximized number so as to provide a one-to-one mapping of holes in both the active membrane (the graphene) and the substrate (the polymer). It can also be said that a graphene pore and the polymer film pore formed by the etching process are coincident with one another in that the graphene pore and the polymer film pore are contiguous with one another. Use of other thin materials disclosed above with a polymer film and bombardment process will provide a similar nanoporous membrane.

Referring now to FIG. 2 an alternative methodology for forming a nanoporous membrane is designated generally by the numeral 50. This embodiment is similar to the methodology shown in FIG. 1 except that a porous membrane is initially laminated to a graphene membrane in a manner employed in the first embodiment. In particular, the methodology 50 utilizes a composite film 52 which utilizes a graphene layer 54 substantially the same as the graphene layer 14. Moreover, all of the characteristics of the graphene layer 14 are provided by the graphene layer 54. In this particular embodiment, the porous polymer layer 56 may be constructed of polycarbonate, polyester, polyimide, polypropylene, polyvinylidene fluoride, poly methyl methacrylate, or other similar materials. The polymer layer 56 is provided with enlarged pores designated generally by the numeral 58.

In the present embodiment the composite film 52 is bombarded in a process 59 by energetic particles 60. The energetic particles selected are similar to those in the previous embodiment; however, they are selected so as not to generate a chemical functionalization of any pores formed in the polymer layer 56 by the bombardment process 59.

In this embodiment, the porous polymer layer 56 is provided with enlarged pores 58 having a diameter of 10 to 1000 nm. Skilled artisans will appreciate that the diameter of the enlarged pores 58 could be even larger than 1000 nm. In any event, bombardment of the energetic particles 60 is directed toward the graphene layer 54, but it will be appreciated that the bombardment may occur by projecting the particles 60 at the porous polymer layer 56. In this embodiment, the energetic particles may be selected so that the polymer layer or film is left chemically inert toward pore enlargement.

As a result of the bombardment process 59 a plurality of pores 62 are generated that extend through the graphene layer 54. The pore 62 is aligned with the enlarged pore 58 and may or may not be concentric therewith. The bombardment also results in formation of a pore 66 that extends through the graphene and only partially into the polymer layer 56 so as to form a cavity 67. And in some cases the particles 60 generate a pore 68 that extends all the way through both the graphene layer 54 and the polymer layer 56. It will further be appreciated that a chemical bond 70 may be formed between the graphene layer 14 and the polymer layer 56 so as to further secure the polymer layer 56 to the graphene layer 54. As a result, the disclosed embodiment provides for alignment of pores 62 to having a diameter ranging from 0.5 nm to 10 nm wherein the underlying pore 58 has an enlarged diameter which may be concentric therewith. Moreover, in this embodiment more than one hole or pore can be made in the graphene layer 54 per pore in the polycarbonate or polymer film layer 56 leading to higher permeability. As a result of the bombardment process, it will be appreciated that a number of pores 58 are aligned with a number of pores 62. As such, the pore 58 and the pore 62 will be contiguous with one another to permit fluid flow therethrough. In other words, the aligned pore 58 and pore 62 may not necessarily have the same relative center point. However, after the bombardment process, a significant number of pores 58 and pores 62 will be concentrically aligned with each other. Other embodiments may employ other thin materials as disclosed above and other polymer materials.

Based on the foregoing, the advantages of the present invention are readily apparent. By covering a nonporous polymer film with an unperforated thin material layer before energy particle bombardment, any later formed thin material perforation is coincident with a track in the polymer film. As disclosed in the first embodiment, subsequent etching of the tracks leaves the graphene pore untouched in terms of diameter but creates a larger pore in the polymer film, which is concentric with the graphene pore, to allow for higher overall permeability of the composite membrane. As a result, one-to-one mapping of holes in both the graphene membrane and the polymer film allows for forming holes in the graphene and the support membrane at the same time. The disclosed methods of manufacturing a nanoporous membrane are advantageous both in terms of membrane performance and manufacturability. By having an exact coincidence between graphene perforations and pores in the support film, the permeability of the composite membrane is much higher compared to composite membranes with random hole registration. Moreover, processing the active layer and support film simultaneously is potentially much easier and more scalable from a manufacturing standpoint. Incorporating extra layers of graphene to exclude defects before perforation also allows for intentional perforations to persist through all layers of the graphene. Were the graphene layers to be perforated individually, overlapping perforations would occur only randomly, thereby decreasing membrane permeability.

In the embodiment which provides for use of a porous polymer film prior to particle bombardment an advantage can be realized by selection of a particle that can be different from the type needed to create tracks in the polycarbonate film. In other words, use of a porous polymer film may allow for flexibility in forming a composite film in the manufacturing process. Additionally, use of a porous polymer film may allow for advantages in use of the composite film. Such a construction may allow for additional flexibility of the composite film. It will further be appreciated that the embodiments disclosed may simultaneously create pores and chemically bond the graphene film to the support film so as to further strengthen the composite material.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A method for making a nanoporous membrane, comprising:
   providing a composite film comprising an atomically thin material layer and a polymer film;
   bombarding said composite film with energetic particles to form a plurality of pores through said atomically thin material layer and a plurality of tracks of chemical functionality through said polymer film; and
   etching said tracks to produce a plurality of enlarged pores in said polymer film, wherein a number of the enlarged pores in said polymer film are aligned with pores through said atomically thin material layer, wherein the polymer film is non-porous prior to being bombarded with energetic particles.

2. The method according to claim 1, wherein each of said plurality of enlarged pores are substantially aligned with one of said plurality of pores through said atomically thin material layer.

3. The method according to claim 1, wherein said plurality of pores through said atomically thin material layer range in size from 0.5 nm to about 10 nm, wherein said plurality of enlarged pores range in size from 10 nm to 1000 nm, and wherein said plurality of enlarged pores have a diameter larger than said plurality of pores.

4. The method according to claim 1, further comprising:
   controlling the bombarding and etching so that said plurality of enlarged pores have a diameter larger than said plurality of pores.

5. The method according to claim 1, further comprising:
   providing said atomically thin material layer as a single atomic layer of carbon material.

6. The method according to claim 1, further comprising:
   providing said atomically thin material layer as multiple atomic layers of carbon material.

7. The method according to claim 1, further comprising:
   utilizing polycarbonate as said polymeric film.

8. The method according to claim 1, further comprising:
   chemically bonding said atomically thin material layer to said polymer film during bombarding.

9. The method according to claim 1, wherein said plurality of pores through said atomically thin material layer range in size from about 0.5 nm to about 10 nm.

10. The method according to claim 1, further comprising:
    selecting said atomically thin material from the group consisting of graphene, few layer graphene, molybdenum disulfide, boron nitride, hexagonal boron nitride, niobium diselenide, silicene, and germanene.

11. The method according to claim 1, wherein the thickness of the polymer film is from 25 micrometers to 250 micrometers.

12. The method according to claim 1, wherein the polymer polymer layer is of polycarbonate, polyester, polyimide, polypropylene, polyvinylidene fluoride or poly methyl methacrylate.

13. The method according to claim 1, wherein the energetic particles are ions.

* * * * *